United States Patent
Raymond (10) Patent No.: US 7,465,369 B2
(45) Date of Patent: Dec. 16, 2008

(54) METHOD OF FABRICATING CONTAINERS WITH INTEGRAL LENTICULAR SYSTEMS AND INNER LABEL INSERTS

(75) Inventor: Mark A. Raymond, Littleton, CO (US)

(73) Assignee: Genie Lens Technologies, LLC, Golden, CO (US)

( * ) Notice: Subject to any disclaimer, the term of this patent is extended or adjusted under 35 U.S.C. 154(b) by 513 days.

(21) Appl. No.: 11/252,910

(22) Filed: Oct. 18, 2005

(65) Prior Publication Data

US 2006/0048888 A1   Mar. 9, 2006

Related U.S. Application Data

(62) Division of application No. 10/299,343, filed on Nov. 19, 2002, now Pat. No. 6,984,425.

(51) Int. Cl.
B32B 37/00 (2006.01)
(52) U.S. Cl. .............. 156/277; 156/196; 156/308.2; 156/309.6
(58) Field of Classification Search .......... 156/309.6, 156/308.2, 196, 277; 264/248, 249; 359/619, 359/621; 428/34.1, 35.7
See application file for complete search history.

(56) References Cited

U.S. PATENT DOCUMENTS

| | | | | |
|---|---|---|---|---|
| 5,494,445 A | * | 2/1996 | Sekiguchi et al. ........... | 434/365 |
| 5,800,656 A | * | 9/1998 | Geurtsen et al. ............ | 156/239 |
| 6,424,467 B1 | * | 7/2002 | Goggins ..................... | 359/626 |
| 2002/0114080 A1 | * | 8/2002 | Guest ......................... | 359/620 |
| 2005/0029337 A1 | * | 2/2005 | Van Handel ................ | 229/403 |

* cited by examiner

*Primary Examiner*—Jeff H Aftergut
(74) *Attorney, Agent, or Firm*—Marsh Fischmann & Breyfogle LLP; Kent A. Lembke (57) ABSTRACT

A method for forming a container with a lenticular lens system integrally formed in a clear sidewall with the lenticular material or lenticules on an exterior or outer surface of the sidewall and a registration framework or system on the interior or inner surface of the sidewall. The registration framework includes a side registration post with a pair of side registration shelves for receiving side edges of an inserted label. The framework includes upper and lower registration shelves extending about the periphery of the interior surface of the sidewall between a top and a bottom portion of the side post between the pair of side registration shelves. The registration shelves define a registration area having a shape corresponding to the label. Sealing flaps extend along the shelves for sealing the label within the cup. The label includes image strips covered by an adhesive layer for bonding with the sidewall surface.

20 Claims, 7 Drawing Sheets

METHOD OF FABRICATING CONTAINERS WITH INTEGRAL LENTICULAR SYSTEMS AND INNER LABEL INSERTS

CROSS-REFERENCE TO RELATED APPLICATIONS

This application is a divisional of U.S. application Ser. No. 10/299,343, filed Nov. 19, 2002, now U.S. Pat. No. 6,984,425, which is incorporated by reference herein in its entirety.

BACKGROUND OF THE INVENTION

1. Field of the Invention

The present invention relates, in general, to structures using lenticular lens materials or sheets to produce images, and, more particularly, to plastic cups, containers, or other objects and methods of making such objects that have a lenticular material integral with a clear outer wall(s) and an inner label insert with a printed image or series of image strips that is bonded and sealed to an inner surface of the container for viewing through the lenticular material.

2. Relevant Background

Products, such as containers and cards, that provide multiple images or motion to an image are appearing everywhere and are used for marketing everything from sports products, to recently released movies, to financial and identification products. Motion or image products use a special technology called lenticular printing that typically takes a batch of images and prints alternating strips of each image on the back of a transparent plastic sheet. The plastic sheet has a series of curved ridges called lenticules or lenticular lenses. When light passes through the plastic sheet, it is reflected from smooth white paper or plastic under the transparent plastic sheet. The returning light passes through the printed image strips and the lenticules are made in such a way as to refract the returning light at a specific angle and to magnify the image. The printed image strips need to be aligned accurately so that all the strips for a particular image (i.e., one in a series of still images that are used to make up a moving image) are refracted to the same point or are visible from a particular viewing angle. Because of the refraction and magnification, the viewer sees a single, complete image and as the viewer changes their line of sight, different image strips are seen as a series of complete images. In this manner, dozens of images in very tiny image strips can be combined to provide numerous images and even a few seconds of smooth video or animation. While the technology continues to improve and is more widely available, several manufacturing problems and associated costs have generally blocked widespread adoption of lenticular imaging within retail and marketing products.

Containers and cups fabricated from plastic are used extensively for goods ranging from water, alcoholic beverages, and soda pop and other beverages to soap and other household products. Billions of such containers and cups are produced each year typically using blow mold or injection molding technologies. The marketing and packaging industry continually struggles to meet two important and, often competing, goals: producing attention-getting, attractive containers to enhance marketing of the product inside the container and controlling material and production costs of the container while meeting government standards for safety (such as, in the United States, Federal Drug Administration standards for containers and cups). Eye catching graphics in packaging can play a large part at the retail level in making a product appealing to consumers. In the packaging industry, there are a variety of techniques that can provide informational graphics as well as illustrative or "eye appeal" graphics that include one color or use more elaborate multi-color graphics or photographs. More elaborate graphics are often produced with lenticular graphic labels using 3-dimensional (3D) and animation. Lenticular lens material is used in the marketing and packaging industries for creating promotional material with appealing graphics and typically involves producing a sheet of lenticular lens material and adhesively attaching the lenticular lens material to a separately produced object for display.

The production of lenticular lenses is well known and described in detail in a number of U.S. patents, including U.S. Pat. No. 5,967,032 to Bravenec et al. In general, the production process includes selecting segments from visual images to create a desired visual effect and interlacing the segments (i.e., planning the layout of the numerous images). Lenticular lenses or lens sheets are then mapped to the interlaced or planned segments or sets of image strips, and the lenticular lenses are fabricated according to this mapping. The lenticular lenses generally include a transparent web that has a flat side or layer and a side with optical ridges and grooves formed by lenticules (i.e., lenses) arranged side-by-side with the lenticules or optical ridges extending parallel to each other the length of the transparent web. To provide the unique visual effects, ink (e.g., four color ink) is applied to or printed directly in thin image strips on the flat side of the transparent web to form a thin ink layer, which is then viewable through the transparent web of optical ridges. The density or number of the lenticules (i.e., the lenticules per inch (LPI)), the thickness of the entire lenticular material, and other physical parameters (such as the diameter of the container or bend of the lenticular material) have to be carefully matched with the printed image to achieve a desired result, with the accuracy required for printing and then registering the images with the lenticules increasing directly with increased LPI, decreased thickness, and decreased container diameter.

While these lenticular lens materials provide excellent visual effects, the use of adhesives and other attachment methods has not proven effective in producing high quality, long-lasting, and inexpensive plastic products. Because attaching the lenticular lens material after producing the container is inefficient and relatively expensive, the plastic manufacturing industry is continually searching for methods for attaching the lenticular lens material to plastic cups or containers as part of the cup or container manufacturing process. To date, the plastic manufacturing industry has only had limited success in overcoming the problems associated with using common lenticular lens material as part of standard plastic fabrication processes. The problems arise because plastic fabrication generally includes processes such as injection molding that involve heating raw plastic materials to a relatively high temperature (e.g., 400 to 500° F. or hotter) and then injecting the fluid plastic into a mold with the shape of the desired plastic object or by otherwise processing the molten plastic. The ink or ink layer has a chemistry that does not stay intact when the ink is heated to these high temperatures, and the image is destroyed or at least significantly altered.

Additionally, the design and manufacturing of the plastic cup or container is often limited as the lenticular material and image generally has to be placed on the external surfaces of a container or cup so that the inside of the container is kept free from compounds (such as compounds that are found in most plastic adhesives) that are regulated by governments as being potentially dangerous if consumed. Further, the use of these graphic techniques is often rejected by the retail industry due to its high cost per container. The lenticular lens labels are typically costly, e.g., nearly double the cost of the other container or cup material. The manufacturing and/or assembly processes are also expensive. For example, in-mold labeling automation equipment is a very large capital expense (e.g., up to and over $100,000 in US dollars for an injection molding machine), which also makes is problematic for planning for capacities and periodic large orders. Hence, these costs can drive margins and capital paybacks to a point that makes it difficult to justify addition of lenticular imagery based on a cost-benefit analysis, e.g., the additional customer attention and increased sales are typically not offset by the reduced profit or margin on each product sale. In many industries, such as the entertainment industry, images for including on a label are not approved or released until a short time before the products are needed, such as immediately before a movie release date. Current manufacturing techniques require manufacturing of the containers along with the lenticular labels such that stocks cannot be produced prior to the production of the labels with the approved image sets. The challenge continues to be to create eye-catching graphics or packaging at a very low cost or even with a cost that is similar to packaging already used in present products.

Also, there has been a limitation in achievable imaging quality because of limitations in the thickness of the lenticular lens systems and printed image (i.e., existing labels). This limitation is seen most clearly in containers and cups manufactured using injection in-mold technology. Generally, as the thickness of the lenticular lenses increases, the power of the lenses increases, which results in enhanced graphic imagery. Unfortunately, the use of labels that combine lenticular material with layers containing printed images typically cannot exceed a relatively thin maximum thickness that is thinner than desired for obtaining high quality imagery. For example, combined lens and image thickness for in-mold labels typically has been less than about 20 mils for plastic cups. This thickness limitation is imposed because thicker plastic labels are difficult to manipulate manually or with robotics due to the stiffness and memory of the label that resist bending and insertion or attachment of the label about the exterior wall of the cup. The memory of the installed or attached label may even cause the finished cup to lose its circular cross sectional shape as the label attempts to return to its original flat shape, i.e., the cup becomes nearly oval in shape. Additionally, thicker labels have proven to be more expensive to manufacture due to material costs and due to processing costs. Further, the wall thickness of the cup or container may be diminished to provide a relatively consistent thickness at locations with a label and without a label, which can lead to structural integrity problems and leaking.

Hence, there remains a need for a method of manufacturing plastic cups and other containers having improved motion imagery or multiple images produced by lenticular material or lenticular lenses combined with a series of printed image strips. Preferably, cups or containers produced according to such method would be less expensive to produce facilitating adoption of lenticular printing in producing a variety of price sensitive products, including plastic cups for marketing entertainment products, events, and services. Additionally, such a manufacturing method would be highly scaleable to support tight production schedules by allowing portions of such cups or containers to be fabricated separately and prior to a final design for an image to be provided on the printed image strips.

SUMMARY OF THE INVENTION

The present invention addresses the above problems by providing a plastic cup that includes a lenticular lens system integrally formed in the clear sidewall of the cup with the lenticular material or lenticules on an exterior or outer surface of the sidewall. Also integrally formed with the sidewall is a registration framework or system on the interior or inner surface of the sidewall for allowing a preprinted label to be "snapped" into place to hold the label during sealing operations and to register the label to the lenticular lens system such that preprinted image strips on the label are substantially parallel to lenticules on the exterior surface of the sidewall. The registration framework includes a side registration post extending along the interior surface of the cup along a longitudinal axis of the cup providing a pair of side registration shelves for receiving side edges of an inserted label. The framework further includes an upper and a lower registration shelf extending about the periphery of the interior surface of the sidewall between a top and a bottom portion of the side post between the pair of side registration shelves. These registration shelves can be thought of as defining a slightly recessed surface or registration area having a shape and size that matches the shape of the label. Sealing flaps are included in the framework and extend along the shelves and prior to sealing, extend outward from the shelves and are flexible enough to allow the label to be snapped into the framework.

The cup can be fabricated, such as be blow molding, in a separate operation. Once the cup is manufactured, labels can be designed based on the size and shape of the registration area and based on the frequency of the lenticules, the thickness of the sidewall (and, therefore, the lenticular material), and other parameters of the integral lenticular lens system. For example, the thickness of the adhesive or bonding layer is preferably selected such that after sealing the image layer of the label or the image strips are positioned at or about the focal point of the lenticular material. The labels are then manufactured by defining the label border (to match the size and shape of the registration area), printing the image strips on a plastic sheet (i.e., the substrate or base layer for the label) to allow registering with the lenticules in the prefabricated (or, at least, pre-designed) cup, applying a protective bonding layer of adhesive material (such as oriented polypropylene), and then carefully cutting the label out of the plastic sheet to retain enable accurate registering when the label is inserted within the registration framework.

DETAILED DESCRIPTION OF THE PREFERRED EMBODIMENTS

The invention is directed generally to a unique plastic container or cup design in which lenticular material is formed integral with the cup, such as in the side walls, with lenticules or lenticular lenses formed on the outer surface of the cup. The cup is further configured for first registering a preprinted label upon an inner surface of the cup adjacent the lenticular material by the inclusion of a registration framework including a side registration post and upper and lower registration shelves. A positioned label once inserted into this registration framework is registered to adjacent lenticules or lenses on the exterior surface of the cup. The registration framework is further adapted for sealing the registered label within the cup with the use of upper, lower, and side sealing flaps that are flexible enough to allow insertion (manual or automatic) of the label but thin enough to be deformed, such as by at least partial melting, by a heated mandrel or die inserted within the cup. The sealing can be aided by the inclusion of a sealing border about the periphery of the printed label upon which no ink is printed to limit the risk of ink being exposed to the contents of the cup. Such sealing is designed to comply with governmental regulations (such as FDA regulations) for beverage containers. The label is additionally sealed and bonded to the inner surface of the cup by applying a thin adhesive layer over the ink prior to insertion in the registration framework. The adhesive is then activated by the heated mandrel. These and additional features of the invention will be explained fully below with reference to the attached figures.

Figure 1:
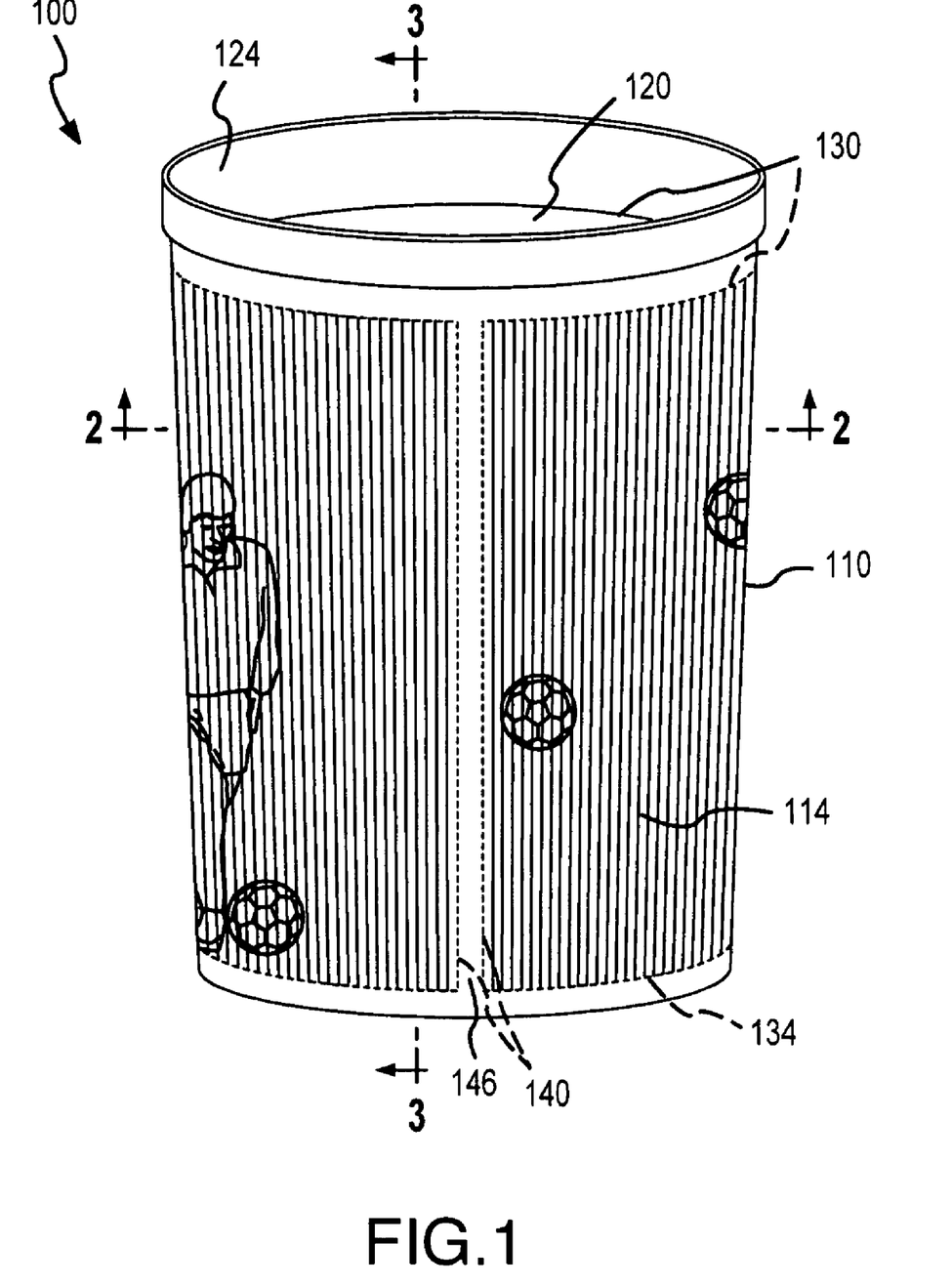
FIG. 1 is a perspective view of a plastic, molded cup with an integral lenticular lens system and a printed label sealed within the cup.

FIG. 1 illustrates an exemplary cup 100 fabricated according to the present invention. According to the invention, the material of the cup 100 itself is reformed or initially fabricated to use that material to form a lenticular lens system and to form a label registration framework with minimal or no additional material being required and allowing the cup 100 (without the inserted label) to be prefabricated and stocked prior to labels, i.e., the imagery for the labels being available. The cup includes a container wall or sidewall 110 that is formed of a clear material such as a plastic, i.e., polyvinyl chloride (PVC), polypropylene, polyethylene, polyester (such as PE, PET, APET, PETG, OPP, HDPT, and the like) or other polymer blends used by the container industry to produce clear or translucent materials. The cup 100 may be formed by blow molding, injection molding, or any other technique useful for producing plastic cups and adapted (as necessary) for the plastic material used to fabricate the cup 100. Such plastic cup manufacturing techniques are well known by those skilled in the arts and is, therefore, not described in detail here because the particular fabrication method is not considered a limitation of the invention. An important aspect of the cup design of the invention is that the cup 100 may be fabricated prior to designing or producing the label to be used with the cup 100, which allows the cup 100 fabrication to be scaleable to support small and large lots of cups 100 with labels installed in relatively short time frames.

The cup sidewall 110 includes an outer or exterior surface 114 upon which numerous lenticules or lenses are formed by ridges or ribs that are integrally formed with the sidewall 110 (i.e., in the same fabrication process and of the same plastic material) and extend parallel to each other and to a longitudinal axis of the container 100. The lenticules on the exterior sidewall surface 114 are configured in frequency (lenticules per inch) and shape (such as width and radius) based on the material of the container wall 110, based on the thickness of the sidewall 110 (and, typically, based on an adhesive used to laminate and bond the label 120 within the cup 100), and the curvature of the container wall 110 to focus on an ink layer of the label 120 (as explained in more detail below). While shown to cover almost all of the exterior surface 114 of the sidewall 110, the lenticules or lenticular array can have a wide variety of dimensions (such as a height and "width") selected to support desired image sizes and graphic imagery results desired. For example, the exterior surface 114 may include one or more windows or areas of lenticules to allow viewing of a printed image through one or more smaller subsets of the exterior surface 110.

The shape and size of the lenticular array on the exterior surface 114 is not limiting to the invention and can be configured to support more than one label 120 inserted on the interior of the cup 100. The important design consideration is that the lenticules be formed on the exterior surface 114 integrally with the fabrication of the sidewall 110 and of the same material to significantly simply fabrication costs, material costs, and eliminate the need for bonding of a lenticular insert or label to a plastic cup. This is a significant improvement as the extra thickness of the sidewall 110 itself used for structural strength also provides enhanced graphics due to the extra focusing power of the lens created by the sidewall 110 with the lenticules provided on the exterior surface 114. Additionally, the mathematics that need to be implemented to design the interlaced images or image strips on the label 120 is simplified as the frequency of the lenticular lens array produced within the sidewalls 110 is reduced along with increasing thickness.

As shown in FIG. 1, the container wall 110 includes an inner or interior surface 124 that contacts any contained liquids in the cup 100. A printed label 120 is inserted within the cup 100 to abut the inner surface 124 and is sealingly engaged by the inner surface 124 of the sidewall 110 with a registration framework. The printed label 120, as will be explained further below, includes a base layer or substrate upon which an ink layer containing the printed image or image strips of an interlaced or non-interlaced image is printed or otherwise provided and the printed image is viewable through the exterior, lenticular surface 114 of the sidewall 110. Upon the ink layer, a lamination layer is provided including an adhesive material that is translucent and more preferably transparent or clear after it is activated. The adhesive layer is placed against the inner surface 124 to bond the label 120 to the sidewall 110 and seal the ink layer of the label 120. The substrate or base layer of the label 120 is preferably fabricated of a material that is approved for use in beverage containers (e.g., is FDA-approved), is printable and/or compatible with a range of inks and stable for accurate printing registration, is strong allowing a thin label to be used, and is waterproof or resistant. For example, the label 120 substrate may be PET, styrene, oriented polypropylene (OPP), a combination of material such as PET and styrene, and other polymer blends with a thickness between 0 and 10 mils and more preferably between about 5 and about 10 mils.

The label 120 is shown to be about the shape of the cup wall 110 when inserted and to be about the size of the exterior surface 114 having the lenticules. However, the size and the shape of the label 120 may be varied widely to practice the invention, with the key feature being that the label 120 have dimensions selected to allow ready insertion within prefabricated cups 100 and for registration within the registration framework provided on the inner surface 124 of the sidewalls 110. A challenge in designing the cup 100 with lenticular arrays provided integral with the sidewall 110 is to print the labels 120 that can be registered accurately to the lenticules on surface 114 and that can also be bonded permanently to the cups 100 easily and inexpensively. The label 120 preferably is bonded so that the labels 120 become a rigid, sealed part of the cup 100, such as part of cup wall 110, and such that the printed ink layer of the label 120 is sealed completely within the inner surface 124 of the sidewall 110 so that the cup 100 is washable (e.g., dishwasher safe) and compliant with applicable government regulations on beverage containers.

In this regard, the registration framework of the sidewalls 110 or cup 100 is provided by a series of registration elements (e.g., shelves, ledges, lips, posts, and the like) that extend outward from the inner surface 124 and/or that define recessed areas that define registration surfaces on the inner surface 124 upon or against which the label 120 is placed upon insertion within the cup 100. As shown in FIGS. 1-5, the inner surface 124 includes an upper registration shelf 132 for receiving an upper edge of the label 120, a lower registration shelf 134 for receiving a lower edge of the label 120, and a side post 146 with side registration surfaces or elements 460 for receiving side edges of the label 120. The upper registration shelf 132 extends about inner circumference of the cup 100 at an upper end of the side post 146 between the side registration surfaces 460 while the lower registration shelf 134 extends about the inner circumference of the cup at a lower end of the side post 146 between the side registration surfaces 460 to define a continuous registration framework upon the inner surface 124 for receiving the label 120, resisting movement of the label 120 after insertion such as due to material memory of the originally flat label 120, and for registering or positioning the label 120 and any image printed on such label 120 relative to the lenticules 450 on the exterior surface 114 of the sidewall 110.

Sealing of the label 120 upon the inner surface 124 of the sidewall 110 is provided by sealing flaps adjacent to and typically attached to the registration surfaces discussed above. The sides or side edges of the label 120 are sealed using side sealing flaps 140 extending outward from both sides of the side registration post 146 (e.g., positioned transverse to an axis of the side registration post 146) and along the entire length of the side post 146. The side sealing flaps 140 extend out a distance or have a length, $L_F$, as measured from the side surface of the post 146 that is selected to be as small as practical to reduce material costs and to facilitate insertion of the label 120 within the registration framework but yet provide adequate sealing between the side edges of the label 120 and the side registration post 146. The side sealing flaps 140 can take a variety of shapes and can optionally be beveled as shown to facilitate insertion of the label 120. Upper and lower sealing flaps 130, 134 are provided for sealing upper and lower edges, respectively, of the label 120 and are positioned adjacent the upper and lower registration shelves 132, 136.

The sealing flaps 130, 134 extend out from the inner surface 124 and bottom surface of the cup 100 distances or lengths, $L_U$ and $L_L$, as measured before sealing deformation, with these lengths $L_U$ and $L_L$ again being selected to provide adequate sealing but also to facilitate insertion and registration of the label 120 on the inner surface 124. Additionally, the sealing flaps 130, 134 can optionally be beveled inward as shown to facilitate insertion of the label 120 within the registration framework. The sealing flaps 130, 134 preferably extend continuously about the inner surface 124 between the side registration shelves or surfaces 460 of the side registration post 146 to provide sealing along the entire upper and lower edges of the label 120. The thickness of the flaps 130, 134, 140 can vary depending on the material and lengths of the flaps to practice the invention, and in one embodiment the thickness, $t_F$, of the side flaps is selected to be between 2 and 8 mils and more preferably about 5 mils to provide desired flexibility for insertion and adequate material for sealing.

Figure 2:
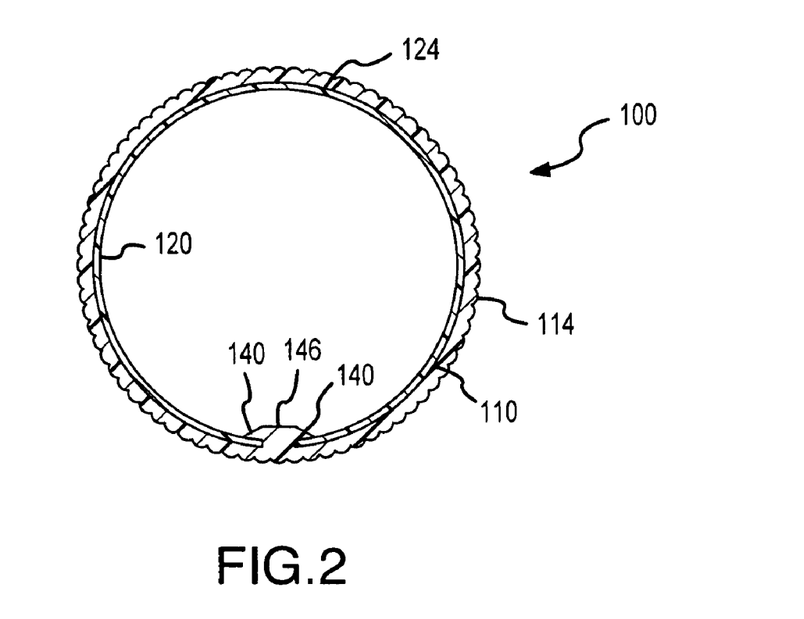
FIG. 2 is a cross section of the cup of FIG. 1 showing the inserted label abutting against a registration post and sealed with side sealing flaps adjoining the registration post.
Figure 3:
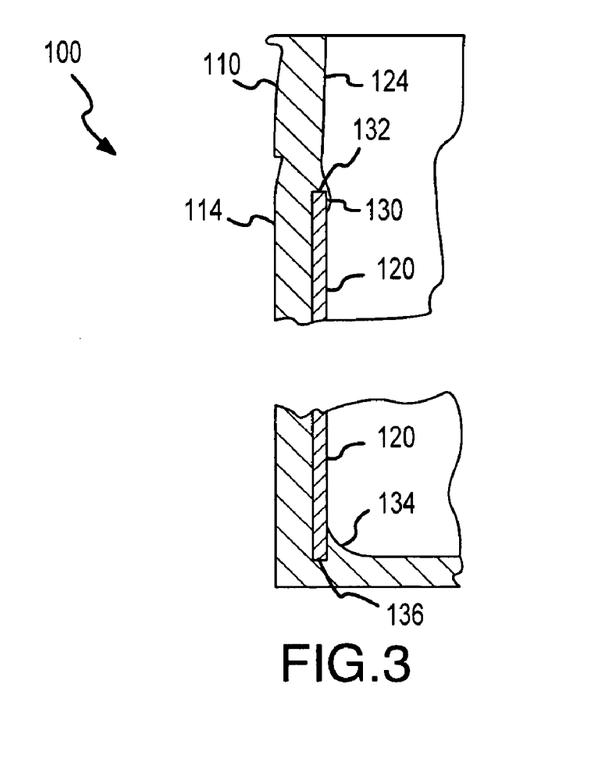
FIG. 3 is a partial sectional view of the cup of FIG. 1 showing a side wall of the cup and the label abutting upper and lower registration shelves and being sealed by upper and lower sealing flaps.

FIGS. 1-3 illustrate the label 120 inserted in the registration framework on the inner surface 124 of sidewall 110 with its side edges abutting the registration shelves 132, 136, and 460. Additionally, these figures shown the label 120 after it has been sealed and adhesive activated such that an inner surface (or adhesive layer) of the label 120 is abutting the inner surface 124 and the sealing flaps 130, 134, and 140 have been deformed to sealingly engage the substrate or base layer of the label 120 to form a continuous seal about the periphery of the label 120, whereby the printed or ink layer is protected from exposure to contents of the cup 100. As will be explained, the sealing flaps 130, 134, and 140 can be deformed in a number of ways including insertion of a mandrel or die having heated outer surfaces with a shape similar to the interior surface 124 such that the flaps 130, 134, 140 are partially melted and due to pressure applied by the mandrel or die are reformed to take the shape and positions shown in FIGS. 1-3.

Figure 4:
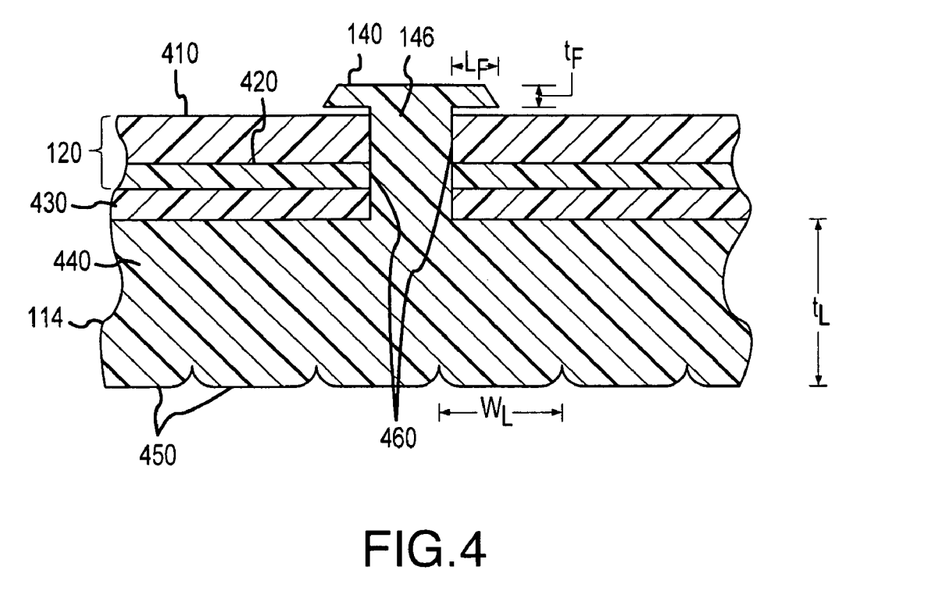
FIG. 4 is an enlarged, partial sectional view of the cup of FIGS. 1 and 2 showing an inserted label abutting the registration post prior to sealing of the label with the side flaps.
Figure 5:
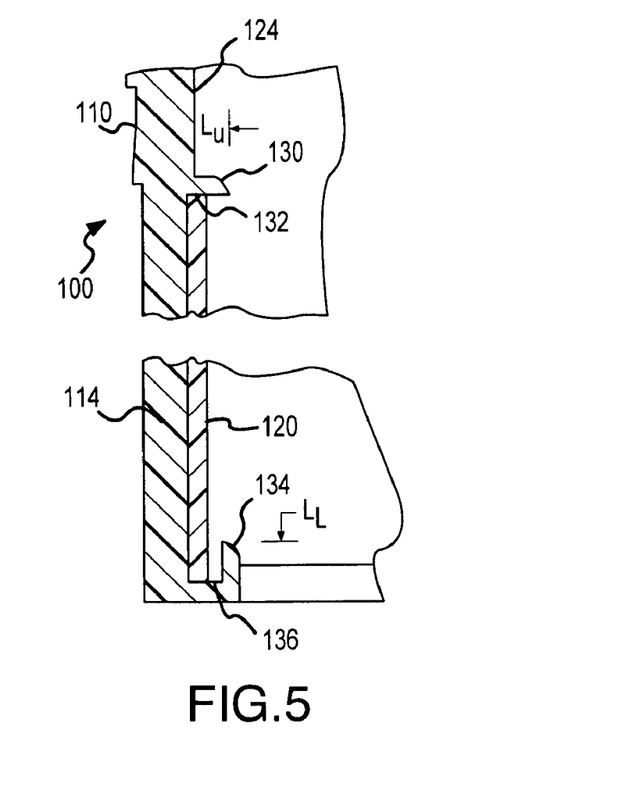
FIG. 5 is a partial sectional view similar to FIG. 3 showing the side wall of the cup with the label inserted but prior to deforming the upper and lower sealing flaps to seal the label within the cup.

FIGS. 4 and 5 illustrate an the cup 100 after a label 120 has been inserted (i.e., registered) but prior to sealing is completed by deformation of the sealing flaps 130, 134, 140. FIG. 4 also is an enlarged view of the sidewall 110 at the interface between the label 120 and the side registration post 146 that is useful for more clearly showing the side registration shelves 460 and for showing the features of the sidewall 110 and of preferred embodiments of the label 120. As shown, the label 120 includes a base or substrate layer 410 fabricated from a plastic material, such as PET, styrene, OPP, or any of a large number of other plastics that are preferably water-resistant, compatible with the plastic used in the sidewall 110 (and, particularly, in the sealing flaps 130, 134, 140), and that is approved by government regulatory agencies or groups for use in beverage containers (i.e., for contacting liquids, cold or hot, that will later be consumed such as carbonated beverages).

An image layer 420 is printed on the base layer 410 including a series of image strips useful for producing a series of still images or a continuous motion image with the sidewall 110 and is typically formed of inks well-known in the plastic industry for use with lenticular material such as inks used gravure, flexography, offset or lithography, and/or digital processes. An adhesive layer 430 (which may or may not be considered part of the label 120 as the label may be printed in operations separate from the application of the adhesive layer 430) is provided over the ink or image layer 420 to bond the label 120 to the inner surface 124 of the sidewall 110 and particularly, to an inner surface 124 adjacent the exterior surface 114 containing the integral lenticular material.

The printing of the images in layer 420 needs to be done based on the configuration of the sidewalls 110 which contain the lenticular material or lenticular lens system for viewing the layer 420. In this regard, the exterior surface 114 includes a relatively flat layer 440 of transparent plastic upon which a series of lenticules 450 are formed, with the overall thickness of the sidewall 110 at the exterior surface 114 being $t_L$ as measured from the tip of each lenticule 450 to an inner contact surface of the wall 110. Each lenticule 450 has a width, $W_L$, and the density of the lenticules 450 is predetermined and directly affects the configuration of the printed image on the ink layer 420. The thickness of the adhesive layer 430 is selected to allow the lenticules 450 to focus on the ink layer 420, and to achieve this end different adhesives may need to be utilized to provide a desired bonding strength with a given thickness of adhesive in layer 430. For example, if the container wall 110 at surface 114 is configured to focus at a depth of 75 mils as measured from the tip of a lenticule 450 and the thickness of the lens, $t_L$, is 73 mils then the adhesive layer 430 preferably would be formed with a thickness of about 2 mils (or 2 mils after activation processes are completed). In some cases, it may be useful to use more adhesive than necessary to achieve an adequate bond simply to provide a desired focal length for the prefabricated sidewall 110. For example, if a focus depth or length of a sidewall 110 were known to be 70 mils and the thickness, $t_L$, of the cup wall 110 was measured to be 67 mils, the adhesive layer 430 can be formed with a thickness of 3 mils although a 2-mil thickness would have provided an adequate bond.

Figure 6:
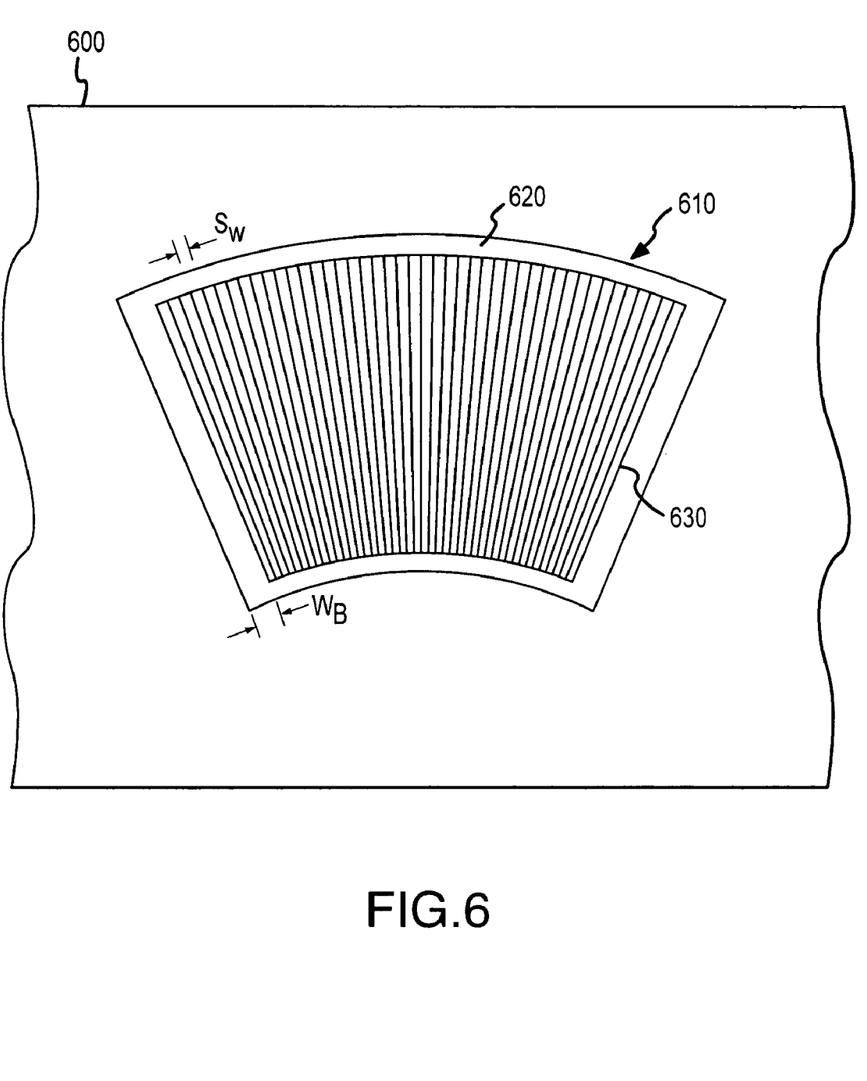
FIG. 6 is a plan view of a label sheet showing a label that has been printed with a series of image strips and including an optional sealing border.

Typically, the labels will be produced in quantity by printing images onto a sheet of substrate or base layer material, applying an adhesive layer such as by lamination, and then accurately cutting the printed label from the sheet accurately to insure accurate registering of the label within a separately fabricated cup. FIG. 6 illustrates a sheet 600 of base layer material having a thickness matching the desired thickness of the base layer (i.e., layer 410), e.g., less than about 10 mils and preferably between about 4 and 8 mils although this may vary depending on the material selected for the label and the size of the label. The precut label 610 shown includes a printed image area 630 upon which a series of image strips with a strip width, $S_W$, are printed to allow a number of images or video clip to be viewed when the printed image area 630 is viewed through a corresponding lenticular system integral to a cup wall upon which the label 610 is mounted. The strip width, $S_W$, is typically selected such that a number of image strips are covered by each lenticule on an exterior surface of a cup such that based on the viewing angle one of the strips is viewed (or alternatively, each "strip" can be thought of as including a plurality of interlaced images, and each lenticule covers a single strip and a number of interlaced images).

According to an important aspect of the invention, the label 610 can be produced based on the configuration of a prefabricated cup but in a separate operation that allows for later insertion in the cup and, importantly, encapsulation of the ink printed on image portion 630. In some embodiments (differing from the embodiment shown in FIG. 6), an adhesive layer (such as layer 430 shown in FIG. 4) is laminated or otherwise provided over the entire label 610 for activation (such as with ultraviolet (UV) radiation, radio frequency (RF) sealing, or other activation techniques). The adhesive layer (such as up to 2 mils or more of OPP or other adhesive) provides the encapsulation or sealing of the ink layer 430 when combined with the sealing flaps of the registration frame.

In the embodiment shown in FIG. 6, a sealing border 620 is provided with a width, WB. The sealing border 620 is part of the label 610 that will be cut from the sheet 600 and inserted in the cup to abut the registration shelves. The sealing border 620 is unprinted, i.e., contains no ink, and encircles the printed area 630. The border width, WB, may vary but typically will be 1/32 to 1/16 inches or larger (such as up to 3/8 inch or larger in some cases). The adhesive film is placed over the sealing border 620 such that effective sealing is provided at the edges of the label 610 to block liquid from seeping behind the registered and sealed label 610 when using the cup (such as cup 100).

Figure 7:
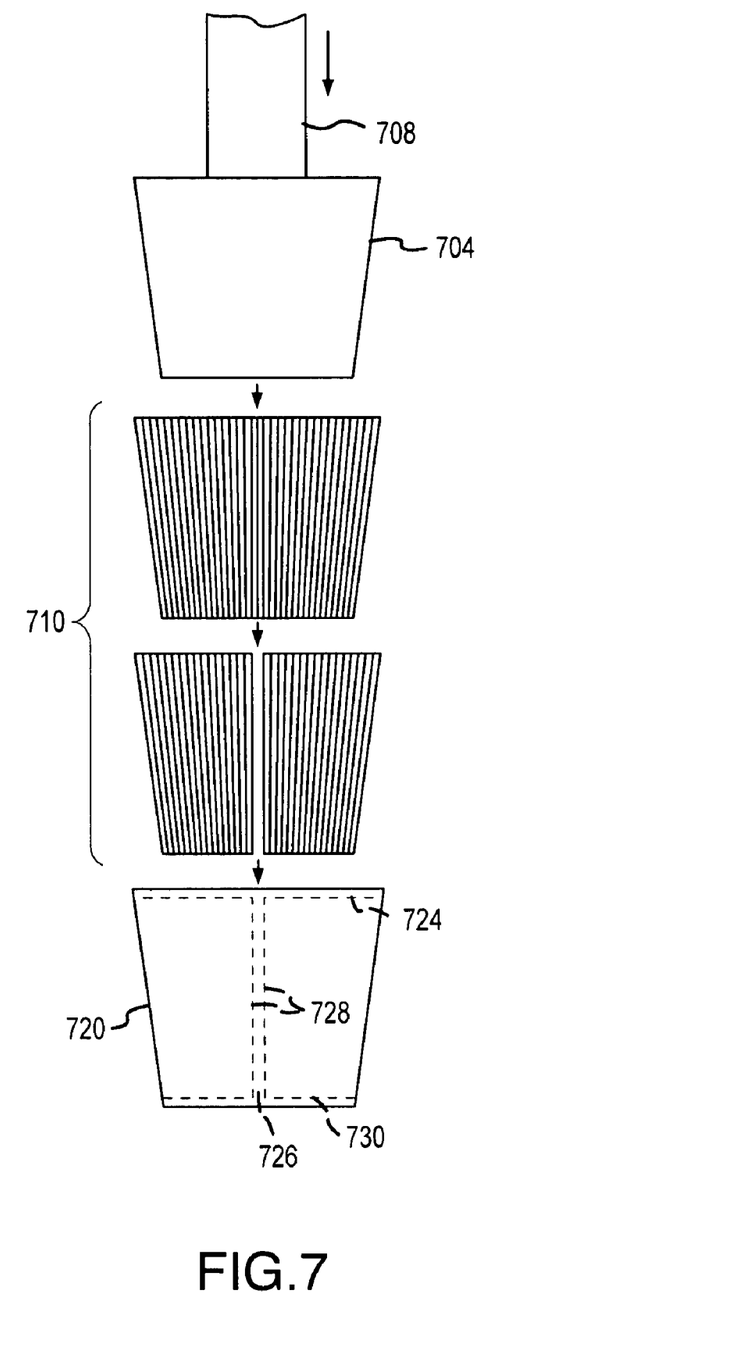
FIG. 7 is an exploded view of the insertion of a preprinted label within a prefabricated cup and sealing with a heated mandrel or die press.
Figure 8A:
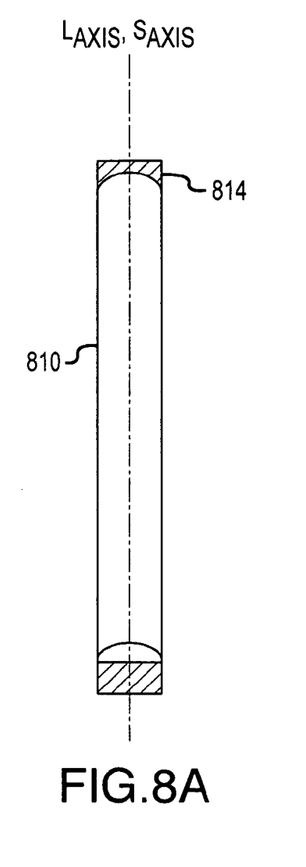
FIGS. 8A-8C illustrate possible alignments of a single lenticule formed on the outer surface of the cup side wall with a printed image strip on a label, with parallel axii being preferred and fully overlapping and parallel axii being more preferred.
Figure 8B:
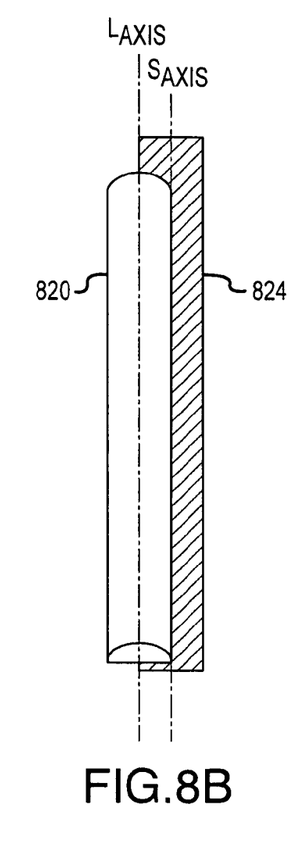
Figure 8C:
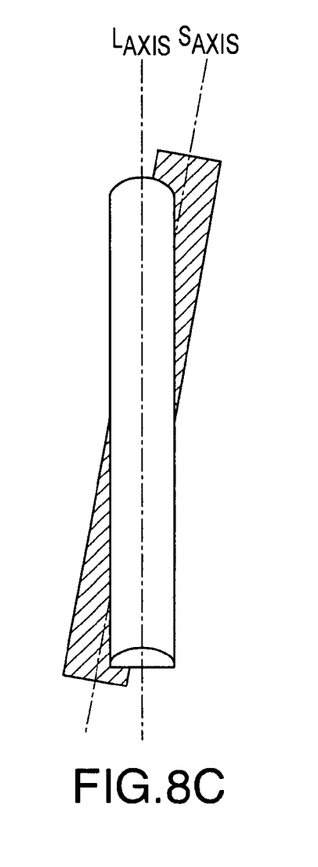
Figure 9:
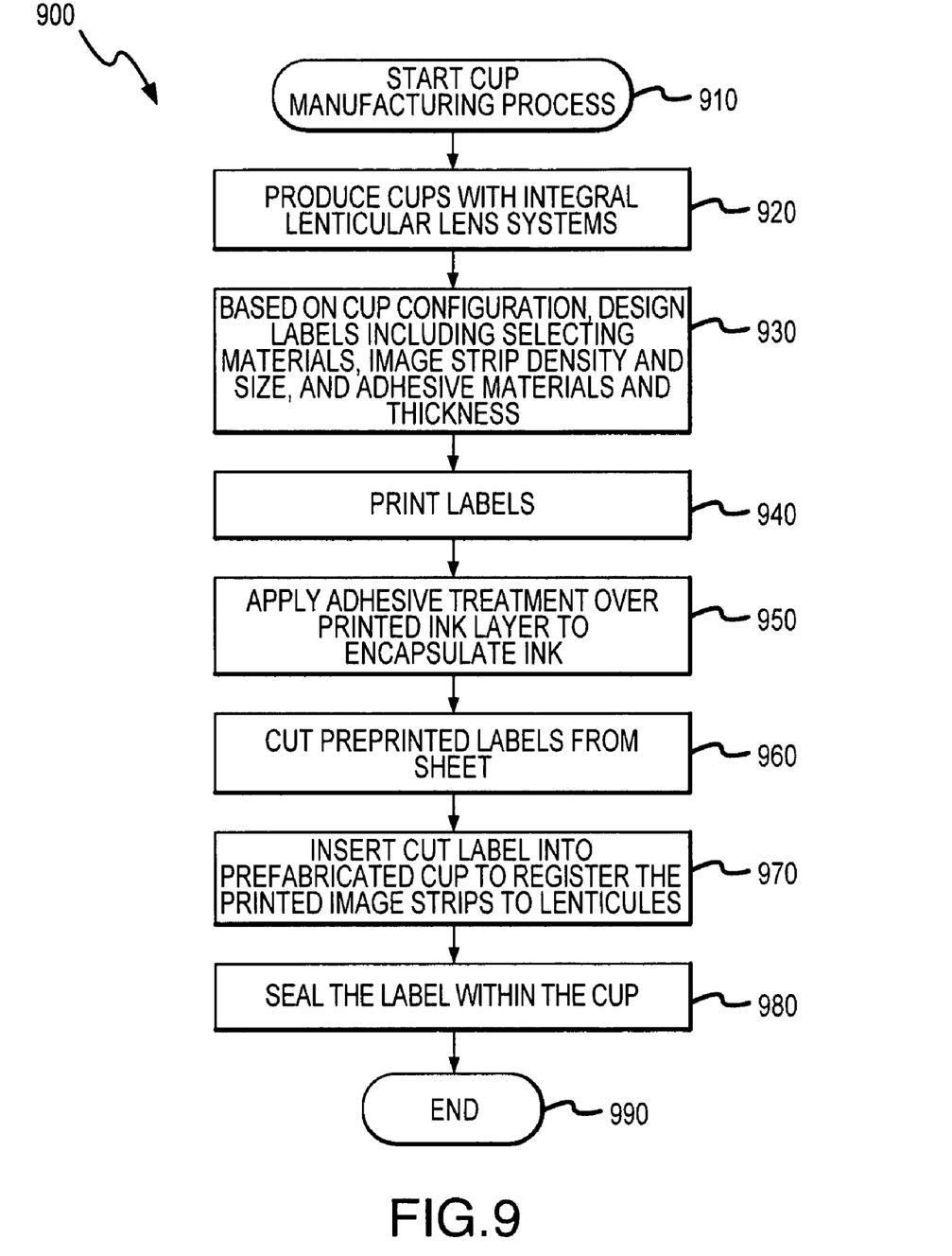
FIG. 9 is a flow chart providing exemplary steps of a process for manufacturing plastic cups with integral lenticular lens systems and inserted and sealed printed labels.

Referring now to FIGS. 7-9, an exemplary process of manufacturing plastic cups (such as cup 100 of FIG. 1) having an integral lenticular lens system and a corresponding printed label registered and sealed within the cup. As shown in FIG. 9, the process 900 starts at 910 typically with selecting generally a line of containers and labels that are to be used with such containers. For example, a determination at 910 may be made to fabricate 32-ounce cups for use sale with soda pop at movie theatres and a size of labels may be chosen (such as substantially covering the entire sidewall 110 as shown in FIG. 1 or covering a smaller portion) along with shapes of such labels. At 920, the blank (i.e., with no label) cups are produced to include lenticular material or lens systems in at least a portion of the cup, such as in a sidewall 110 as shown for cup 100 in FIG. 1. The thickness of the integral lenticular lens system preferably is the same as or similar to the thickness of a similar cup having no lenticular material, so as to provide adequate structural strength while controlling material and processing costs for the cup. The use of basically the full thickness of a plastic cup (such as 30 to 70 mils) provides a much thicker lens system than cups upon which a lenticular label is later affixed. The thickness of the lenticular material (i.e., the cup wall) allows much more data to be placed in the printing on the label such as 36 frames or image strips per lenticule rather than 12 frames as was the case for a 75 LPI lens of standard thickness. This added thickness allows video clips as well as enhanced 3D effects to be produced while also providing improved quality and higher tolerance for registering the printed image on the label to the lenticules.

The particular fabrication method utilized for producing the cup may vary and includes any of the standard plastic fabrication techniques including blow molding, injection blow molding, extrusion blow molding, casting, extrusion, and the like. The material used for the cup may also vary but preferably is selected to provide a clear-walled container to provide an effective integral lens system, and may include PET, PVC, APET, OPP, HDPT, and other polymer blends. Further, the fabrication of standard lenticular material sheets, i.e., those not formed as part of a container wall 110, is well known by those skilled in the printing arts and such knowledge may be utilized at least in part in designing the molding or arrangement of the lenticules on surface 114 (in combination with the use of the design formulas discussed below). For example, lenticular material fabrication is described in U.S. Pat. No. 5,967,032 to Bravenec et al. and U.S. Pat. No. 5,753,344 to Jacobsen, which are incorporated herein by reference. Additionally, the method of laying out or arranging inserts (or labels 130) for a conical container similar in some ways to container 100 is illustrated in FIG. 1 of U.S. Pat. No. 5,908,590 to Yoshimi et al., which is incorporated herein by reference, which is directed to producing labels for foamed resin containers.

Optical results of the wall 110 are also determined by other physical characteristics of the wall 110 including the material of the wall 110, the frequency of the lenticules or ridges 450 (typically measured in lenticules per inch (LPI)), the curvature of the wall 110, and the radius (or width) of the lenticules or lens, $t_L$, and the relationships between these characteristics or design parameters. Additionally, the resulting optical effect is determined in part by the material selected for an adhesive and the thickness of the adhesive layer 430.

As explained in U.S. patent application Ser. No. 10/230,751, which is a co-pending application filed by the same inventor and incorporated in its entirety by reference herein, in general, there is a direct relationship between the lenticule lens thickness (or container wall thickness), $t_L$, the lenticule frequency (e.g., LPI), and both the amount and quality of data and the overall graphic quality and effect provided by the lenticular lens system. In general, as lens thickness increases, $t_L$, the size of the lenticule (as indicated by the width or radius, $W_L$, of the lenticule 450) gets larger. Hence, the thicker the lenticule 450 the more data that can be placed under the lenticule 450 on the printed image 420 and the better overall 3D, animated, or other effect can be achieved in graphical image printed in layer 420. A mathematical or formulaic process can be used to create or design the lenticular lens system at 920 and is adapted such that the lens thickness, $t_L$, lenticule frequency (LPI), radius, $W_L$, and other array and system parameters such as viewing angle and array/container curvature work in unison to create a desired lens, with selected parameters being set to obtain a desired result (such as better 3D effects or better animation) and then adjusting other parameters to support the preset characteristics (such as curvature, material of the container, and the like).

It is often desirable to minimize the use of excess materials for the lens system in wall 110 in most plastic container applications. To provide a desirable or effective graphic effect in these applications, it is desirable to use the most effective or powerful lenticular lens array configuration as possible with a given container wall thickness, $t_L$. In practice, such lens arrays generally have viewing angles of 45 degrees or more and more radical lens radii of 4 to 8 degrees. Many popular and functional lens array configurations that can be used for in wall 110 that are good for 3D and animation have viewing angles in the 47 to 50 degree range with lens radii in the 4 to 6 degree range, and many manufactured lenticular materials have viewing angles of about 48 degrees with 5 degree lens radii, which are readily manufactured and are compatible for existing printing technologies. These ranges are provided for exemplary purposes and not as a limitation as these parameters may readily be altered to practice the invention as long as the parameters of the array discussed below are selected to substantially comply with the following mathematical relationships and dependencies.

In the past, lenticular lens design has involved a relatively large amount of guesswork with success depending on a designer or manufacturer's prior experience and knowledge. The design problem is compounded for the lens arrays (such as an integral system provided in wall 110) included in container walls as the arrays are made of a number of materials that must be calibrated or matched to the curve or shape of the container wall (and integral array). In practice, the thickness of the container wall (and hence of the lens, $t_L$) is known or set and the material of the lens array and container wall is preselected, which provides a known refractive index for the lens array. The refractive index of a material relates to the rate at which the material can bend white light, with the higher the index the less thickness is required to bend the light (which is desirable in most container applications to control material costs). While numerous materials may be utilized to fabricate containers, most plastic containers are made of PET, which has a similar refractive index to APET and PETG, and hence, the following examples employ PET as the container wall and lens array material.

The following symbols are used: "A" for the refractive index of the polymer or the glass of the container wall and lenticular lens array; "B" for the thickness of the lens array (i.e., $t_L$); "C" for the radius of the top of an individual lens (i.e., $W_L$); "D" for the viewing angle of the array; "E" for the curvature of the container; "F" for the frequency of the lenticules typically provided in units of LPI; and "G" for the lens coefficient (which was determined by inventors to be the ratio of F/B). Also, in the following example, parameters or design variables A, C, D, and E are presumed constant and known.

The established goal for these design examples are to calculate or determine a working lens frequency for a PET container that has a viewing angle, D, of about 48 degrees, a 4 to 6 degree radius, C, and a thickness, B, of 10.4 mils (e.g., a common container thickness).

In order to determine a useful lenticule frequency, F, a "lens coefficient", G, is calculated to determine the mathematical relationship between existing lens arrays in the marketplace that perform well in lenticular printing applications. In theory, there should be a close or nearly exact mathematical relationship between a calculated or designed lens array and an actual lens array that when graphed would present itself as nearly a straight line or median in which the thickness of the lens, B, required in the lens material at a particular frequency, F, could be determined and/or more importantly, the frequency, F, could be determined that would be necessary to complete a lens array within the restraints of a given or existing container wall thickness and design.

The coefficient, G, is provided by the ratio of F/B (or G multiplied by B equals F). If the thickness, B, is 10.4 mils and G can be determined to be 11.53 from working or existing lens arrays with about the desired viewing angles, D, and lens radius, C. Hence, in this example, the lenticule frequency, F, is 120 LPI (i.e., 11.53 multiplied by 10.4). In this example, G is obtained from a graph of the relationship of frequency, F, to lens coefficient, G, as determined from an actual relationship in a fabricated lens array from which a straight line relationship of the lens coefficient, G, is obtained with median line. Such a graph is based on a lens array with a viewing angle of 48 degrees and a 4 to 6 degree lens radius, C, along with a constant refractive index for the material of the lens array, A, and a known curvature of the container, E. The actual curve is prepared based on the measurements of frequency, F, of 60, 75, 85, 100, 140, and 200 LPI with corresponding thicknesses, B, of 28.5, 18.3, 14, 12, 8, and 6 mils, which led to lens coefficients, G, as graphed of 2.1, 4.09, 5.66, 8.33, 17.50, and 33.30. Overall, the lenticule frequency or LPI and the lens radius can be decreased as the radius of the container wall 110 is decreased (or angle of curvature is increased). Likewise, as the radius of the container wall 110 increases the lenticular lens system may be more flattened (with smaller lens radii) but still provide effective focusing on the printed image layer 420.

Referring again to FIG. 9, the process 900 at 920 allows blank cups to be manufactured without regard to later inserted imaging content, which allows an operator to run molding machines to create an inventory of low cost cups with lenticular lens systems and internal registration frameworks or systems. For example, a manufacturer in one country may manufacture blank cups according to the invention and as shown in FIG. 1 and then export the cups to another country or another company within the same country for insertion of printed labels. This separate and upfront fabrication enabled by the invention allows the base cup to be manufactured at or near the cost of manufacturing standard plastic cups of similar size, shape, and thickness.

At 930, based on the configuration of the cups produced or to be produced in step 920, labels are designed for insertion in the prefabricated cups. For example, a material for substrate layer 410, 600 is selected by complying with design criteria including approved use by government regulatory bodies (such as the FDA in the United States), a material that is compatible with printed inks, a material that is flexible and thin for insertion in the registering framework, and that is water-resistant or waterproof For example, numerous plastics may be employed such as, but not limited to, PET, styrene, OPP, and the like. The thickness of the overall label is chosen based on the design of the registration framework (i.e., a thickness that allows insertion between sealing flaps 134 and 140 and the inner surface 124 and that lends itself to sealing with sealing flaps 130, 134, 140). The shape and overall size of the label also is based on the registration framework such that when inserted the label abuts each of the registration shelves 132, 136, and 146 with little or no slack such that when an adhesive is activated a good seal is obtained and, importantly, the printed image strips or data packets on the label are properly registered with the lenticules of the cup wall.

FIGS. 8A-8C are useful for illustrating the importance of accurate registration of the label within the registration framework of the cup. The cup label preferably is registered within the cup with the interlaced printed label lining up nearly exactly, i.e., with each lenticule 810 overlapping a printed image strip 814 and with their axii, $L_{AXIS}$ and $S_{AXIS}$, parallel. It is important that the printed label containing the interlaced images (such as in image or ink layer 420) is not only sized and engineered at 930 to match the frequency of the lens array integral in the cup wall (such as in wall 110) but also such that when installed in the cup registration framework that printed image strips 814 are parallel with the lenticules 810. In some cases, a cup can be configured such that there is provided some tolerance with registration such that the lenticules 820 do not fully overlap the printed images 824 as long as parallelism between the axii, $L_{AXIS}$ and $S_{AXIS}$, is substantially maintained, as shown in FIG. 8B. Typically, visual results are not acceptable if registration of a label results in overlap of a lenticule of a printed image strip without parallelism of the two as shown in FIG. 8C. The frequency and size of the image strips printed on the labels generally is elected to match the lenticule frequency and size in the exterior surface 114 of the container wall 110, although the image can be smaller or larger than the lenticules and/or the area provided by the lenticular lens system for focusing on an image.

Adhesive materials and thickness of the adhesive layer 430 is also selected at 930. As discussed earlier, the adhesive material is preferably selected to be clear after activation and is selected allow the lenticular lens system of the container wall 110 to focus on the image in the ink layer 420. A number of adhesives can be utilized to this end and in one embodiment, OPP is used because of the ease of processing (both lamination and activation), its relatively low cost, and its usefulness in encapsulating most inks in layer 420. OPP is also desirable for activation with RF sealing techniques that facilitate short dwell times (e.g., less than about 1 second) but other adhesives useful with RF or thermal sealing processes can be used such as certain PVCs, polyethylene-based sealants, and thermoplastic polyurethane materials. Alternatively, adhesive materials useful in hot melt processes, pressure sensitive adhesives, water-based adhesives, and/or UV processes may employed for the adhesive layer 430.

At 940, the label is printed (i.e., the image or ink layer 420 is applied to substrate layer 410, 600) using any of a number of useful printing methods commonly employed with lenticular materials, such as offset printing or lithography, digital processes, and the like. The printing is typically performed repetitively onto a sheet 600 of the substrate material to allow mass production of the labels 610. The printing is performed to correspond to the container or cup made in step 920 such that each strip contains a number of data sectors (or a number of strips are provided for each lenticule), the printed image strips match the width of the lenticules and, typically, the length of the lenticules, and the frequency of the lenticules. Note, that the label 610 is printed in a print area 630 when the label 610 is flat but must correct for the fact that the label 610 will be later shaped to mate with the inner surface of the cup 124 as shown at 710 in FIG. 7.

At 950, the printed label (or ink layer 420) is coated with an adhesive or bonding/protecting material selected at 930, such as clear OPP. Alternatively, the adhesive can be placed in the cup in the inner surfaces of the registration framework prior to insertion of the label into the cup. In the preferred embodiment, an adhesive film is laminated or otherwise applied over the ink 420 to form a protective layer 430 to encapsulate the ink of the image strips (such as with an OPP thermal film) and is then sealed over the label (such as by a thermal treatment between 190 and 300° F.). During step 950, the adhesive material may be applied to the pre-printed sheets 600 using screen printing methods, roller coating methods, spraying techniques, extrusion, lamination techniques, and/or other methods. A preferred adhesive material dries and then is activated using heat or RF activation to allow the sheets to be easily handled after the adhesive material dries. One embodiment uses polyethylene material for the adhesive which is solid at room temperatures yet is liquid at temperatures exceeding a specific level, such as in the range of about 200 to 250° F.

At 960, the pre-printed and coated labels 610 are cut using known techniques, such as a guillotine cutter, a die cutter, a punch device, and the like, from the sheet 600 for insertion in the cup 100. In order to achieve high registration accuracy, the labels 610 are cut out of the sheet or roll 600 using techniques that provide for low tolerances, such as less than about $\frac{1}{32}$-inch or less. Note, the size and shape of the label 610 preferably is cut to match the registration surfaces of the cup 100 and also the cutting is performed such that the label 610 can be accurately registered within the registration framework with the lenticules in the adjacent cup wall 110 being parallel (and, preferably, overlapping) to the image strips of the printed image layer 420.

With reference also to FIG. 7, at 970 the cut label 710 is inserted within a prefabricated cup with sidewalls 720 providing an integral lenticular lens system. The label 710 can be inserted manually or with robotics and is first bent to approximately the interior shape of the sidewall 720 with a gap provided of about the size of the registration post 726. The bent label 710 is "snapped" into place within the registration framework to abut the registration shelves 724, 728, and 730 with little or no play or slack in the registered label as the memory of the previously flat label 710 pushes against each shelf 724, 728, and 730 as well as outward against the inner surface of the container wall 720 (i.e., the adhesive layer 430 is pressed against the flat layer 440 of the lenticular lens system). The registration shelves act as a picture frame for the inserted label before and after sealing operations.

At 980, the label 710 is sealed to and within the cup in the registration framework. In one embodiment, the adhesive in layer 430 is selected to be thermally or RF activated and in this case, a heated mandrel 704 is inserted at a raised temperature (such as 200 to 300° F.) under pressure provided by press 708. The sealing flaps (e.g., flaps 130, 134, 140) are slightly melted and then deformed by the pressure applied by mandrel or die 704, which provides a watertight seal about the periphery of the registration framework and the edges of the label 710. Referring additionally to FIG. 4, the mandrel 704 activates the adhesive layer 430 by first heating the substrate 410 and ink layer 420 and then raising the adhesive layer 430 to an activation temperature. The mandrel 704 is then cooled and removed allowing the adhesive in layer 430 to return to its solid state. The mandrel 704 may be configured as an RF heat sealer, such as when the adhesive is OPP, to quickly generate the desired temperature, such as 350° F., and quickly return to a low or cooling temperature to provide a brief dwell period of about 0.5 to 2 seconds. When the adhesive utilizes UV chemistry, the activation temperature may be lower but typically the overall dwell time would be increased. At 990, the process 900 is ended for the cup and can begin for a next cup.

In an alternative embodiment, the registration framework is not provided on the inner surface of the cup. Instead, the preprinted and adhesively coated label is mounted or placed on a mandrel (such as with a vacuum) with a particular orientation and the mandrel is inserted into the cup in a fashion that "registers" the printed image strips in the label to adjacent or corresponding lenticules within the lenticular lens system provided in the cup sidewall. The mandrel is then heated to activate the RF, UV, or other thermal activated adhesive material in the bonding/sealing layer (such as layer 430) and then cooled to set the adhesive material. The label is not "registered" within the cup and is bonded to the inside surface of the cup sidewall. Sealing in this case is provided solely by the adhesive between the ink layer and the interior portions of the cup. Also, accurate registration as discussed with reference to FIG. 8 may be more difficult to achieve, and hence, this embodiment may be more useful in situations in which overlap and parallelism of the lenticules and printed image strips is not as important for achieving a desired imagery result with the resulting cup. Additionally, at least a lower, sealing flap or slot can be provided to receive the lower edge of the label and to provide sealing when the flap is deformed by the mandrel applying heat and pressure to the flap.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the above description discusses the invention with reference to plastic beverage cups but the invention can readily be applied to other plastic containers and objects that include at least one clear wall. The clear wall of the object can be formed with an integral lenticular lens system and a registration framework can be formed on the opposite side with a printed label inserted and then sealed within the registration framework.

I claim:

1. A method of producing containers useful for producing graphic images, comprising:
    providing a plastic cup having a sidewall comprising a thickness of a clear plastic and including a plurality of lenticular lenses formed integrally with an exterior surface of the sidewall and including a registration framework formed integrally with an interior surface of the sidewall and including registration shelves defining a label registration area having a given shape and size;
    defining a label border on a sheet of plastic, the label border corresponding substantially with the shape and size of the registration area;
    printing a series of image strips within the label border; applying a layer of adhesive over the image strips;
    forming a label by cutting the plastic sheet along the label border; inserting the cut label into the plastic cup to contact the registration shelves with the adhesive layer contacting the interior surface within the registration area; and
    sealing the label within the cup, wherein the sealing includes inserting a mandrel into the cup to contact the inner surface of the label and heating the mandrel to at least an activation temperature of the adhesive.

2. The method of claim 1, wherein the cup further includes sealing flaps extending adjacent the registration shelves, the sealing including deforming the sealing flaps to contact peripheral edges of the inserted label.

3. The method of claim 1, wherein the printing includes selecting a number of the image strips based on a number of the lenticular lenses and positioning the image strips within the label border such that when the cut label is positioned during the inserting the image strips are substantially parallel to the lenticular lenses.

4. The method of claim 3, further wherein the positioning is performed such that the image strips are overlapped by corresponding ones of the lenticular lenses.

5. The method of claim 1, wherein the lenticular lenses each focus through the thickness of the clear sidewall and a thickness of the adhesive layer onto a focal point on about the image strips of the label.

6. The method of claim 5, wherein the adhesive layer comprises oriented polypropylene.

7. A method of manufacturing a beverage container that is configured for producing a graphical image observable by a viewer external to the container, comprising:
    forming a sidewall with an exterior surface and an interior surface, wherein the sidewall comprises a substantially transparent plastic, wherein during the sidewall forming a lenticular lens system is formed integrally with the sidewall to comprise the substantially transparent plastic of the sidewall and including a plurality of lenticules on the exterior surface, and further wherein during the sidewall forming a registration framework is formed integrally with the sidewall on the interior surface;
    positioning a label within the registration framework including an ink layer including printed ink in a plurality of image strips, wherein the image strips are registered to the lenticules; and
    sealing the label within the registration framework, wherein the sealing of the label comprises deforming a portion of the registration framework to abut and sealingly engage the label.

8. The method of claim 7, wherein the registration framework comprises sealing flaps extending along registration shelves configured to receive the positioned label and wherein the sealing flaps are the portion of the registration framework that are deformed during the sealing.

9. The method of claim 8, wherein the sealing includes positioning a heated mandrel adjacent the interior surface to contact the sealing flaps.

10. The method of claim 9, further comprising applying an adhesive to at least a portion of the label, wherein the portion of the label with applied adhesive abuts the interior surface of the sidewall during the positioning of the label, and wherein the mandrel is heated to at least an activation temperature of the adhesive.

11. The method of claim 7, wherein the registration framework includes a side post with a pair of side registration shelves for receiving side edges of the label, an upper registration shelf for receiving an upper edge of the label, and a lower registration shelf for receiving a lower edge of the label.

12. The method of claim 11, wherein the registration framework includes sealing flaps extending adjacent the registration shelves and sealingly engaging the label, whereby a continuous seal is provided about the periphery of the label.

13. The method of claim 7, wherein the label further includes a substrate layer upon which the ink layer is positioned and an adhesive layer encapsulating the ink layer, the adhesive layer being bonded to the interior surface of the sidewall.

14. A method of manufacturing a container, comprising:

forming a sidewall with an exterior surface and an interior surface, wherein the sidewall comprises a substantially transparent material, wherein a lenticular lens system is formed integrally with the sidewall so as to include a portion of the substantially transparent sidewall and to include a plurality of lenticules on the exterior surface of the sidewall, and further wherein during the sidewall forming a registration framework is formed integrally with the sidewall on the interior surface;

positioning a label within the registration framework including an ink layer including a plurality of image strips, wherein the image strips are registered to the lenticules; and sealing the label within the registration framework;

wherein the registration framework includes a side post with a pair of side registration shelves for receiving side edges of the label, an upper registration shelf for receiving an upper edge of the label, and a lower registration shelf for receiving a lower edge of the label.

15. The method of claim 14, wherein the sealing of the label comprises deforming a portion of the registration framework to abut and sealingly engage the label.

16. The method of claim 15, wherein the registration framework comprises sealing flaps extending along registration shelves configured to receive the positioned label and wherein the sealing flaps are the portion of the registration framework that are deformed during the sealing.

17. The method of claim 16, wherein the sealing includes positioning a heated mandrel adjacent the interior surface to contact the sealing flaps.

18. The method of claim 17, further comprising applying an adhesive to at least a portion of the label, wherein the portion of the label with applied adhesive abuts the interior surface of the sidewall during the positioning of the label, and wherein the mandrel is heated to at least an activation temperature of the adhesive.

19. The method of claim 14, wherein the registration framework includes sealing flaps extending adjacent the registration shelves and sealingly engaging the label, whereby a continuous seal is provided about the periphery of the label.

20. The method of claim 14, wherein the label further includes a substrate layer upon which the ink layer is positioned and an adhesive layer encapsulating the ink layer, the adhesive layer being bonded to the interior surface of the sidewall.

* * * * *